(12) United States Patent
Cho et al.

(10) Patent No.: US 11,565,499 B2
(45) Date of Patent: *Jan. 31, 2023

(54) LAMINATE AND WINDOW FILM AND ELECTRONIC DEVICE

(71) Applicant: SAMSUNG ELECTRONICS CO., LTD., Suwon-si (KR)

(72) Inventors: Chung Kun Cho, Suwon-si (KR); Nobuji Sakai, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 42 days.

This patent is subject to a terminal disclaimer.

(21) Appl. No.: 17/232,234

(22) Filed: Apr. 16, 2021

(65) Prior Publication Data

US 2021/0229398 A1 Jul. 29, 2021

Related U.S. Application Data

(63) Continuation of application No. 16/544,957, filed on Aug. 20, 2019, now Pat. No. 10,987,897.

(30) Foreign Application Priority Data

Aug. 27, 2018 (KR) .......... 10-2018-0100269

(51) Int. Cl.
  *B32B 7/02* (2019.01)
  *B32B 27/08* (2006.01)
  (Continued)

(52) U.S. Cl.
  CPC .......... *B32B 7/02* (2013.01); *B32B 17/10009* (2013.01); *B32B 27/08* (2013.01);
  (Continued)

(58) Field of Classification Search
  CPC .......... B32B 17/10009; B32B 2250/02; B32B 2250/03; B32B 2255/10; B32B 2255/20; B32B 2255/26; B32B 2255/28; B32B 2270/00; B32B 2307/402; B32B 2307/412; B32B 2307/51; B32B 2307/536;
  (Continued)

(56) References Cited

U.S. PATENT DOCUMENTS 10,987,897 B2 * 4/2021 Cho .......... B32B 7/02
2016/0221316 A1 8/2016 Yairi et al.

FOREIGN PATENT DOCUMENTS

JP 2016078458 A 5/2016
JP 2016147416 A 8/2016
(Continued)

*Primary Examiner* — Lawrence D Ferguson
(74) *Attorney, Agent, or Firm* — Cantor Colburn LLP

(57) ABSTRACT

A laminate includes a substrate, a self-healing layer on the substrate and having a thickness of greater than or equal to about 50 micrometers, a protective layer between the substrate and the self-healing layer, and a surface layer on the self-healing layer and having a thickness of about 20 nanometers to about 300 nanometers, wherein the self-healing layer has a first elastic modulus and the protective layer has a second elastic modulus, wherein the second elastic modulus is about 1.2 times to about 50 times greater than the first elastic modulus, and wherein the surface layer has a friction coefficient of less than or equal to about 1.

20 Claims, 3 Drawing Sheets

(51) Int. Cl.
   *B32B 17/10* (2006.01)
   *C08J 7/04* (2020.01)
   *G02B 1/14* (2015.01)
   *G02F 1/1333* (2006.01)
   *C08K 3/36* (2006.01)
   *C08L 83/00* (2006.01)
   *C08J 5/18* (2006.01)

(52) U.S. Cl.
   CPC . *C08J 5/18* (2013.01); *C08J 7/04* (2013.01); *C08K 3/36* (2013.01); *C08L 83/00* (2013.01); *G02B 1/14* (2015.01); *G02F 1/133305* (2013.01); *C08K 2201/011* (2013.01)

(58) Field of Classification Search
   CPC ........ B32B 2307/546; B32B 2307/584; B32B 2307/728; B32B 2307/744; B32B 2307/746; B32B 2307/762; B32B 2457/20; B32B 2457/202; B32B 2457/206; B32B 27/065; B32B 27/08; B32B 27/281; B32B 27/34; B32B 27/36; B32B 27/365; B32B 7/02; B32B 7/12; C08G 77/442; C08J 2367/02; C08J 2475/16; C08J 5/18; C08J 7/04; C08J 7/042; C08J 7/046; C08K 2201/011; C08K 3/22; C08K 3/36; C08K 5/5435; C08L 83/00; C09D 183/10; G02B 1/14; G02F 1/133305; G02F 1/133331; G02F 2201/50; G02F 2202/022

See application file for complete search history.

(56) References Cited

FOREIGN PATENT DOCUMENTS

| | | |
|---|---|---|
| JP | 2017064968 A | 4/2017 |
| KR | 1020160034463 A | 3/2016 |

* cited by examiner

LAMINATE AND WINDOW FILM AND ELECTRONIC DEVICE

CROSS-REFERENCE TO RELATED APPLICATION

This application is a continuation of U.S. patent application Ser. No. 16/544,957, filed on Aug. 20, 2019, which claims priority to and the benefit of Korean Patent Application No. 10-2018-0100269, filed in the Korean Intellectual Property Office on Aug. 27, 2018, and all of the benefits accruing therefrom under 35 U.S.C. § 119, the contents of which are incorporated herein by reference in their entirety.

BACKGROUND

1. Field

A laminate, a window film including the laminate, and an electronic device including the window film are disclosed.

2. Description of the Related Art

A portable electronic device such as a smart phone or a tablet PC may include a window film including a rigid glass substrate or plastic substrate for protecting a display module, and a functional layer having various functions may be applied on a surface of the window film.

The use of touch screen panel recognizing a contact position of a finger or a tool in a smart phone or tablet PC is becoming more prevalent. Accordingly, it would be beneficial to provide an improved window film capable of performing various functions.

SUMMARY

An embodiment provides a laminate capable of satisfying desired mechanical characteristics and surface characteristics.

Another embodiment provides a window film including the laminate.

Yet another embodiment provides an electronic device including the window film.

According to an embodiment, a laminate includes a substrate, a self-healing layer on the substrate and having a thickness of greater than or equal to about 50 micrometers (μm), a protective layer between the substrate and the self-healing layer, and a surface layer on the self-healing layer and having a thickness of about 20 nm to about 300 nm, wherein the self-healing layer has a first elastic modulus and the protective layer has a second elastic modulus, wherein the second elastic modulus is about 1.2 times to about 50 times greater than the first elastic modulus, and wherein the surface layer has a friction coefficient of less than or equal to about 1.

The substrate may include a polymer substrate having a third elastic modulus and the second elastic modulus may be less than the third elastic modulus.

The first elastic modulus may be about 0.1 megapascals (MPa) to about 100 MPa.

The protective layer and the self-healing layer may each include a polymer having a cross-linked structure, and a cross-link density of the protective layer may be greater than a cross-link density of the self-healing layer.

The protective layer and the self-healing layer may each independently include a cured product of a multi-functional urethane, a cured product of a multi-functional epoxy, a cured product of a multi-functional urea, or a combination thereof.

The self-healing layer may include a cured product of a first urethane (meth)acrylate including a (meth)acrylate group and at least six urethane groups.

The self-healing layer may further include silica, a metal oxide, a substituted or unsubstituted polyhedral silsesquioxane, or a combination thereof.

The protective layer may include a cured product of a second urethane (meth)acrylate including at least two (meth)acrylate groups and at least one urethane group, wherein the number of the urethane groups in the second urethane (meth)acrylate is less than the number of urethane groups of the first urethane (meth)acrylate.

The protective layer may further include silica, a metal oxide, a substituted or unsubstituted polyhedral silsesquioxane, or a combination thereof.

The surface layer may include a cured product of a silicon (meth)acrylate, a cured product of a fluorine (meth)acrylate, a cured product of a urethane (meth)acrylate, a cured product of a polyrotaxane, or a combination thereof.

The surface layer may further include silica, a metal oxide, a substituted or unsubstituted polyhedral silsesquioxane, or a combination thereof.

The surface layer may include a cured product of polyrotaxane, a cured product fluorine (meth)acrylate, and a cured product polyhedral silsesquioxane.

The protective layer may have a thickness of about 20 μm to about 100 μm.

The self-healing layer may have a thickness of about 50 μm to about 100 μm.

The second elastic modulus may be about 2 times to about 10 times greater than the first elastic modulus.

The substrate may include polyethylene terephthalate, polycarbonate, polyimide, polyamide, polyamideimide or a combination thereof.

The laminate may have a contact angle of greater than or equal to about 100 degrees and a pencil hardness of greater than or equal to about 6 H simultaneously, wherein the pencil hardness may be a maximum pencil hardness at which a scratch is no longer visible after 3 minutes at 50° C. following formation of the scratch with a load of 1 kg.

According to another embodiment, a window film includes the laminate.

The window film may be a flexible window film.

According to another embodiment, an electronic device includes the window film.

The laminate having good mechanical characteristics and surface characteristics, and the window film including the same, are provided.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
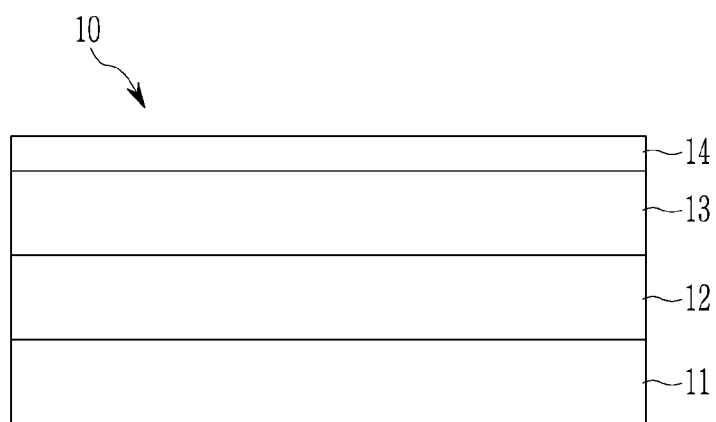
FIG. 1 is a cross-sectional view of a laminate according to an embodiment.

Example embodiments of the present disclosure will hereinafter be described in detail, and may be easily performed by a person having an ordinary skill in the related art. However, actually applied structures may be embodied in many different forms, and is not to be construed as limited to the example embodiments set forth herein. Rather, these embodiments are provided so that this disclosure will be thorough and complete, and will fully convey the scope of the invention to those skilled in the art. Like reference numerals refer to like elements throughout.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In the drawings, parts having no relationship with the description are omitted for clarity of the embodiments, and the same or similar constituent elements are indicated by the same reference numeral throughout the specification.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, unless a definition is otherwise provided, the term "substituted" refers to the replacement of a hydrogen atom of a compound with a substituent selected from a halogen atom, a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C3 to C30 heteroaryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, and a combination thereof.

As used herein, unless a definition is otherwise provided, the term "hetero" refers to a compound or group including 1 to 4 heteroatoms, wherein the heteroatom is each independently N, O, S, Se, Te, Si, or P.

As used herein, unless a definition is otherwise provided, the term "acryl" refers to an acrylate or methacrylate, or the corresponding acid or salt thereof.

As used herein, the term "cured product" refers to compound that has been subjected to photocuring (e.g., exposure to UV light) or thermal curing (e.g., exposure to heat) or both for a time sufficient to facilitate crosslinking or polymerization or both of reactive groups.

Hereinafter, the term "combination" is inclusive of blends, mixtures, alloys, reaction products, stack structures, and the like, and refers to two or more.

Hereinafter, a laminate according to an embodiment is described.

FIG. 1 is a cross-sectional view of a laminate according to an embodiment.

Referring to FIG. 1, a laminate 10 according to an embodiment includes a substrate 11, a protective layer 12, a self-healing layer 13, and a surface layer 14.

The substrate 11 may be made of a transparent polymer and may be a polymer film or a copolymer film obtained by polymerization of at least one monomer and/or oligomer.

The substrate 11 may have a light transmittance of greater than or equal to about 80%, for example greater than or equal to about 85%, in a visible wavelength region of about 380 nanometers (nm) to about 780 nm. The substrate 11 may have a yellowness index (YI, ASTM D1925) of less than or equal to about 4.0 (absolute value), for example less than or equal to about 3.5 (absolute value).

The substrate 11 may have an elastic modulus of greater than or equal to about 1 gigapascal (GPa), for example greater than or equal to about 2 GPa, greater than or equal to about 3 GPa, greater than or equal to about 4 GPa, or greater than or equal to about 5 GPa. For example, the substrate 11 may have an elastic modulus of about 1 GPa to about 10 GPa, about 2 GPa to about 9 GPa, about 3 GPa to about 8 GPa, or about 4 GPa to about 7 GPa.

The substrate 11 may be made of, for example, polyethylene terephthalate, polycarbonate, polyimide, polyamide, polyamideimide, or a combination thereof, but is not limited thereto.

The substrate 11 may have, for example, a thickness of about 20 micrometers (μm) to about 100 μm. Within the range, the substrate 11 may have, for example, a thickness of about 20 μm to about 95 μm, about 25 μm to about 95 μm, or about 30 μm to about 95 μm.

The self-healing layer 13 may be disposed on the substrate 11 and may self-heal damage, such as a scratch, within a relatively short period of time. The self-healing may be, for example, performed by a hydrogen bonding force, but is not limited thereto.

The self-healing layer 13 may include a polymer having a cross-linked structure, for example a cured product of a monomer and/or an oligomer including at least one polymerizable group. The self-healing layer 13 may include for example a cured product of a urethane having at least one polymerizable group, a cured product of an epoxy having at least one polymerizable group, a cured product of a urea having at least one polymerizable group, or a combination thereof, but is not limited thereto.

For example, the self-healing layer 13 may include a cured product of urethane (meth)acrylate having a (meth) acrylate group and a urethane group, for example, a cured product obtained by coating a self-healing composition including urethane (meth)acrylate having a (meth)acrylate group and an urethane group and curing the same. The self-healing composition may be for example a photocurable composition and/or a thermally curable composition.

For example, the urethane (meth)acrylate may have a structure having one or two (meth)acrylate groups (CH$_2$=CHC(=O)O— or CH$_2$=C(CH$_3$)C(=O)O—) at the terminal end of a core having a urethane moiety. The (meth)acrylate group at the terminal end may be a cross-linkable functional group and thus may be a chemical crosslinking site. The urethane (meth)acrylate may have an appropriate cross-linking degree due to the one or two (meth)acrylate groups, and thus the cured product obtained from the self-healing composition may have an appropriate flexibility, elasticity, and hardness and may have foldable, bendable, or rollable characteristics.

For example, the urethane (meth)acrylate may have at least six urethane groups (—NHC(=O)O—), for example, at least three diisocyanate-derived units and at least two diol-derived units between the chemical crosslinking sites. Such urethane (meth)acrylate may have at least one physical cross-linking site interposed between chemical crosslinking sites. When external stress is applied, the bond at the physical cross-linking site may be broken before the bond at the chemical crosslinking site, and the bond at the physical cross-linking site may be restored by itself. Thus, the physical cross-linking site may be a part that enables self-healing when a scratch occurs. The urethane (meth)acrylate having at least six urethane groups may exhibit a self-healing property at room temperature in a short time after a scratch occurs. Even if a scratch is formed by high pencil hardness of 4 H or more, for example 6 H or more, or 8 H or more occur, it may be self-healed.

The urethane (meth)acrylate may include, for example, at least six, at least seven, at least eight, at least nine, or at least ten urethane groups, and for example, 100 or less, 60 or less, 40 or less, 20 or less, or 14 or less urethane groups.

For example, the urethane (meth)acrylate may be an aliphatic urethane (meth)acrylate, an aromatic urethane (meth)acrylate, or a combination thereof. For example, the aliphatic urethane (meth)acrylate may be a reaction product of an aliphatic diisocyanate, an aliphatic diol, and an aliphatic hydroxy(meth)acrylate. For example, the urethane (meth)acrylate may be a reaction product of (a) a C1 to C20 aliphatic diisocyanate, (b) a C1 to C100 aliphatic diol, and (c) a C1 to C20 hydroxyalkyl(meth)acrylate. Specific examples of the aliphatic diisocyanate are not particularly limited, and may include, for example, isophorone diisocyanate, hexamethylene diisocyanate, 4,4-dicyclohexylmethane diisocyanate, hydrogenated xylene diisocyanate, norbornene diisocyanate, lysine diisocyanate, or a combination thereof, but is not limited thereto.

For example, the urethane (meth)acrylate may have a structure represented by Chemical Formula 1, but is not limited thereto.

[Chemical Formula 1]

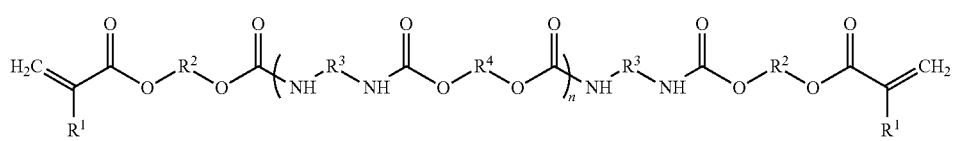

In Chemical Formula 1, n may be an integer of 2 to 30, $R^1$ may be hydrogen or a methyl group, $R^2$ and $R^3$ may each independently be a substituted or unsubstituted C1 to C20 alkylene group, or a substituted or unsubstituted C3 to C20 cycloalkylene group, and $R^4$ may be a substituted or unsubstituted C1 to C10 alkylene, a C2 to C100 divalent functional group including an ether, an ester, or a combination thereof, or a combination thereof.

For example, the urethane (meth)acrylate may have a weight average molecular weight (Mw) of about 3,000 grams per mole (g/mol) to about 100,000 g/mol, for example, about 3,000 g/mol to about 50,000 g/mol, or about 5,000 g/mol to about 10,000 g/mol. When the urethane (meth)acrylate has a weight average molecular weight within the above-described ranges, it may have excellent transparency, flexibility, and self-healing characteristics and may show a stability to ultraviolet (UV) light. Herein, the weight average molecular weight may be measured using gel permeation chromatography and a polystyrene standard.

The urethane (meth)acrylate may have a glass transition temperature (Tg) of about −40° C. to about 40° C., for example about −30° C. to about 30° C., or about −20° C. to about 20° C. When the urethane (meth)acrylate has the above-described glass transition temperature range, the urethane (meth)acrylate may show excellent transparency, flexibility, and self-healing characteristics.

The self-healing layer 13 may further include nanoparticles having a diameter of, for example, a nanometer level. For example, the nanoparticles may be particles having a diameter of about 1 nm to several hundred nanometers, for example, particles having diameters of about 1 nm to about 100 nm. The nanoparticles may be a population of nanoparticles having an average diameter a diameter of, for example, about 1 nm to several hundred nanometers, for example, particles having an average diameter of about 1 nm to about 100 nm.

The nanoparticles may be for example inorganic nanoparticles, organic nanoparticles, or organic/inorganic nanoparticles. The nanoparticles may include, for example, silica, a metal oxide, a substituted or unsubstituted polyhedral silsesquioxane, or a combination thereof. The metal oxide may be, for example, alumina or titanium oxide, but is not limited thereto.

The nanoparticle may be dispersed in a polymer having a cross-linked structure and form a hard film to increase a surface hardness.

The self-healing layer 13 may have high elasticity and dense film quality by including the polymer having the cross-linked structure and optionally nanoparticles as described above. Accordingly, a surface scratch caused by an external force may be prevented or reduced, and damage such as a surface scratch may be self-healed in a short time.

The self-healing layer 13 may have an elastic modulus of about 0.1 megapascals (MPa) to about 100 MPa. The elastic modulus may be a Young's modulus.

The self-healing layer 13 may have a thickness of, for example, greater than or equal to about 50 μm. The self-healing layer 13 may have a thickness of about 50 μm to about 100 μm, for example about 50 μm to about 80 μm, or about 50 μm to about 70 μm within the range. The self-healing layer 13 may effectively exhibit self-healing performance by having a thickness within the above-described range.

The protective layer 12 may be disposed between the substrate 11 and the self-healing layer 13, and may be, for example a substrate protective layer for protecting the substrate 11. For example, the protective layer 12 may prevent damage to the substrate 11 by an external force which is transferred from the surface of the laminate 10, through the surface layer 14 and the self-healing layer 13.

The protective layer 12 may have a greater elastic force than the self-healing layer 13, and for example, the elastic modulus of the protective layer 12 may be greater than the elastic modulus of the self-healing layer 13. For example, the elastic modulus of the protective layer 12 may be, for example, about 1.2 times to about 50 times, about 1.2 times to about 30 times, about 1.2 times to about 20 times, about 1.2 times to about 10 times, about 1.2 times to about 5 times, about 1.5 times to about 30 times, about 1.5 times to about 20 times, about 1.5 times to about 10 times, about 1.5 times to about 5 times, about 2 times to about 30 times, about 2 times to about 20 times, about 2 times to about 10 times, or about 2 times to about 5 times, greater than the elastic modulus of the self-healing layer 13.

On the other hand, the elastic modulus of the protective layer 12 may be less than the elastic modulus of the substrate 11. Accordingly, flexibility of the laminate 10 may be ensured and thus the laminate 10 may effectively be applied as a flexible window film.

The protective layer 12 is not particularly limited as long as it is a material having the above-described elastic modulus.

For example, the protective layer 12 may include a polymer having a cross-linked structure, for example a cured product of a monomer and/or an oligomer having at least one polymerizable group. The protective layer 12 may include for example a cured product of a multi-functional urethane, a multi-functional epoxy, a multi-functional urea, or a combination thereof, but is not limited thereto. A cross-link density of the protective layer 12 may be greater than a cross-link density of the self-healing layer 13.

For example, the protective layer 12 may be a cured product of a urethane (meth)acrylate having a (meth)acrylate group and a urethane group, for example, and may be for example a cured product obtained by coating a protective layer composition including a urethane (meth)acrylate having a (meth)acrylate group and a urethane group and then curing the same. The protective layer composition may be, for example, a photocurable composition and/or a thermally curable composition. The protective layer composition may be different from the self-healing composition.

For example, the urethane (meth)acrylate may have a structure having at least two (meth)acrylate groups ($CH_2$=CHC(=O)O— or $CH_2$=C($CH_3$)C(=O)O—) at the terminal end of a core having a urethane moiety. The (meth)acrylate group at the terminal end may be a cross-linkable functional group and may be a kind of a chemical crosslinking site. The urethane (meth)acrylate may have a high cross-linking degree by having at least two (meth)acrylate groups, whereby the cured product obtained from the protective layer composition may have a hard film quality and high elasticity so that the substrate 11 may be effectively protected.

For example, the urethane (meth)acrylate of the protective layer 12 may have a number of urethane groups that is less than the number of urethane groups in the self-healing layer 13 described above, and may have a structure having about 6 or less urethane groups (—NHC(=O)O—). For example, the structure of the urethane (meth)acrylate of the protective layer 12 may have two or less diisocyanate-derived units and two or less diol-derived units between chemical crosslinking sites. For example, the urethane (meth)acrylate of the protective layer 12 may have, for example, about 5 or less, about 4 or less, about 3 or less, about 2 or less, or one urethane group(s).

For example, when the protective layer composition and the self-healing composition respectively include a urethane (meth)acrylate, the urethane (meth)acrylate included in the protective layer composition has a number of (meth)acrylates greater than or equal to the urethane(meth)acrylate included in the self-healing composition, and a number of urethane groups that is less than the urethane(meth)acrylate included in the self-healing composition. Accordingly, the protective layer 12 may be configured to have a higher cross-linking density than the self-healing layer 13 and thus show a high elastic modulus as described above. Put another way, the cured product in the protective layer 12 may have a higher cross-link density than the self-healing layer 13 and thus show a high elastic modulus as described above.

For example, the urethane (meth)acrylate included in the protective layer composition has a weight average molecular weight (Mw) of about 2,000 g/mol to about 15,000 g/mol, for example, about 3,000 g/mol to about 10,000 g/mol, or for example, about 4,000 g/mol to about 7,000 g/mol.

The protective layer 12 may further include, for example, a nanoparticle and the nanoparticle is the same as described above.

The protective layer 12, for example, may have a thickness of greater than or equal to about 10 μm. Thus, the protective layer 12 may effectively protect the substrate 11 disposed thereunder. The protective layer 12 may have a thickness of about 10 μm to about 100 μm, for example, about 20 μm to about 100 μm or about 30 μm to about 80 μm.

The protective layer 12 includes a polymer having a crosslinked structure, and a high cross-link density as described above, and thus may have a high elastic modulus. Accordingly, the protective layer 12 may block an external force from being transferred to the substrate 11 and prevent damage to the substrate 11.

The surface layer 14 may be disposed at the outermost surface of the laminate 10 and may be, for example, a fingerprint resistance layer, a scratch resistance layer, or a hard coating layer, but is not limited thereto.

The surface layer 14 may have a low friction coefficient and, for example, may have a friction coefficient of less than or equal to about 1. When the friction coefficient is within the range, the slip properties of the surface layer may be improved. The friction coefficient of the surface layer 14 may be, for example, less than or equal to about 0.8, less than or equal to about 0.6, less than or equal to about 0.5, less than or equal to about 0.4, less than or equal to about 0.3, or less than or equal to about 0.2, within the range.

The surface layer 14 may include a material having low surface energy, for example, a cured product of silicon (meth)acrylate, a cured product of fluorine (meth)acrylate, a cured product of urethane (meth)acrylate, a cured product of polyrotaxane, or a combination thereof, but is not limited thereto.

For example, the surface layer 14 may include a cured product of silicon (meth)acrylate, and may be, for example, a cured product obtained by coating a surface layer composition including silicon (meth)acrylate and then curing the same. The surface layer composition may be, for example, a photocurable composition and/or a thermally curable composition.

The siloxane (meth)acrylate may include a Si—O—Si (siloxane) moiety and a meth(acrylate) group and may be a reaction product of a siloxane compound and a (meth)acrylate-containing compound. For example, the siloxane (meth)acrylate may be obtained by copolymerizing a siloxane compound and a (meth)acrylate-containing compound in a solvent.

The siloxane compound may have, for example, various shapes such as a chain structure, a reticular structure, and the like.

The siloxane compound may be, for example, a siloxane compound having a chain structure and may be, for example, represented by Chemical Formula 2.

[Chemical Formula 2]

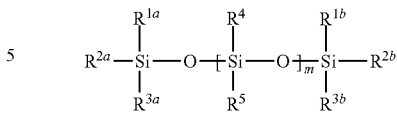

In Chemical Formula 2,
$R^{1a}$, $R^{2a}$, $R^{3a}$, $R^{1b}$, $R^{2b}$, $R^{3b}$, $R^4$, and $R^5$ are each independently hydrogen, a substituted or unsubstituted C1 to C30 alkyl group, a substituted or unsubstituted C3 to C30 cycloalkyl group, a substituted or unsubstituted C2 to C30 heterocycloalkyl group, a substituted or unsubstituted C6 to C30 aryl group, a substituted or unsubstituted C3 to C30 heteroaryl group, a substituted or unsubstituted C2 to C30 alkenyl group, a substituted or unsubstituted C1 to C30 alkoxy group, or a hydroxy group, and
$0 \leq m < 1000$.

The (meth)acrylate-containing compound may be a monomer having a (meth)acrylate group, an oligomer having a (meth)acrylate group, a polymer having a (meth)acrylate group, or a combination thereof. The (meth)acrylate-containing compound may include, for example, an alkyl (meth)acrylate, a hydroxyalkyl (meth)acrylate, a ((meth)acryloyloxy)alkyl isocyanate, a homopolymer thereof, a copolymer thereof, or a combination thereof, but is not limited thereto. Herein the alkyl group may be, for example, a C1 to C30 linear or branched alkyl, for example C1 to C10 linear or branched alkyl.

The (meth)acrylate-containing compound may include for example a homopolymer or a copolymer including methyl (meth)acrylate, hydroxyethyl (meth)acrylate, 2-((meth)acryloyloxy)ethyl isocyanate, or a combination thereof. The (meth)acrylate-containing compound may be for example a copolymer of poly(methyl (meth)acrylate) or methyl (meth)acrylate, hydroxyethyl (meth)acrylate, and 2-((meth)acryloyloxy)ethyl isocyanate, but is not limited thereto. The (meth)acrylate-containing compound may be for example a copolymer of methyl (meth)acrylate, hydroxyethyl (meth)acrylate and 2-((meth)acryloyloxy)ethyl isocyanate, and the copolymer may be for example obtained by copolymerizing methyl (meth)acrylate with hydroxyethyl (meth)acrylate and then introducing 2-((meth)acryloyloxy)ethyl isocyanate by a grafting reaction. Herein, an amount of hydroxyethyl (meth)acrylate and 2-((meth)acryloyloxy)ethyl isocyanate may be each independently about 5 weight percent (wt %) to about 15 wt %.

The siloxane compound and the (meth)acrylate-containing compound may be included in a weight ratio of about 20:80 to about 50:50. When the siloxane compound and the (meth)acrylate-containing compound are included within the ratio range, high transparency and surface hardness may be effectively ensured.

The siloxane (meth)acrylate may have a weight average molecular weight (Mw) as measured by a gel permeation chromatography (GPC) using a polystyrene standard, of about 50,000 g/mol to about 400,000 g/mol, for example about 100,000 g/mol to about 300,000 g/mol.

For example, the surface layer 14 may include a cured product of fluorine (meth)acrylate, and may be for example a cured product obtained by coating a surface layer composition including fluorine (meth)acrylate and then curing the same. The surface layer composition may be for example a photocurable composition, a thermally curable composition, or a combination thereof.

The fluorine (meth)acrylate may be (meth)acrylate including at least one fluorine, for example a monofluoro-, difluoro-, trifluoro- or higher alkyl (meth)acrylate, or a perfluoroalkyl (meth)acrylate where the alkyl group may be, for example, a C1 to C30 linear or branched alkyl, for example C1 to C10 linear or branched alkyl. The surface layer composition including the fluorine (meth)acrylate may further include a siloxane compound.

For example, the surface layer 14 may include a cured product of polyrotaxane and may be for example a cured product obtained by coating a surface layer composition including polyrotaxane and then curing the same.

The polyrotaxane may refer to a compound having a mechanically interlocked polymer architecture consisting of a dumbbell shaped molecule which is threaded through a macrocycle. The polyrotaxane may include a cyclic molecule, a linear molecule penetrating a ring of the cyclic molecule, and a capping group at both terminal ends of the linear molecule. The polyrotaxane may be move flexibly in response to external pressure to provide good flexibility and may be highly stretched.

In the polyrotaxane, the cyclic molecule may be a cyclic molecule having a hydroxyl group and may be for example a cyclodextrin-based compound, specifically, a compound including α-cyclodextrin, β-cyclodextrin, γ-cyclodextrin, or a combination thereof.

For example, the polyrotaxane may have a curable functional group at the terminal end of the cyclic molecule. For example, the cyclic molecule may be a cyclodextrin-based compound having a structure in which a portion or all of the hydroxyl groups of the cyclodextrin is substituted with a functional group including a curable functional group. The polyrotaxane including the cyclic molecule may have an appropriate hardness and flexibility, and so may be applied for the curable film.

The curable functional group may be a functional group that may be cured by a reaction with light, for example a (meth)acrylate, a vinyl group, an allyl group, a hydroxyl group, a cyanate group, a thiol group, or a combination thereof, but is not limited thereto. The cyclic molecule may include at least one curable functional group, for example two or more, or six or less, or four or less curable functional groups.

For example, the cyclic molecule may be a cyclodextrin-based compound including (meth)acrylate groups at both terminal ends.

The curable functional group may be substituted directly onto cyclodextrin or may be substituted via a linking group such as a poly(C1 to C20 alkylene), a poly(C1 to C20 alkylene glycol), or a polycaprolactone, and the like. That is, the cyclic molecule may be a cyclodextrin-based compound substituted with a poly(C1 to C20 alkylene) having a curable functional group at a terminal end, a poly(C1 to C20 alkylene glycol) having a curable functional group at a terminal end, or a polycaprolactone having a curable functional group at a terminal end. For example, the cyclic molecule may be cyclodextrin substituted with polycaprolactone having a (meth)acrylate group at a terminal end.

In the polyrotaxane, the linear molecule may include, for example, polyethylene glycol, polyisoprene, polyisobutylene, polybutadiene, polypropylene glycol, polytetrahydrofuran, polydimethylsiloxane, polyethylene, polypropylene, or a combination thereof, and in this case, the linear molecule of the polyrotaxane is stable when exposed to ultraviolet (UV) and has improved optical properties. A molecular weight of the linear molecule may be greater than or equal to about 10,000 g/mol, or greater than or equal to about 30,000 g/mol and less than or equal to about 500,000 g/mol.

The capping groups are positioned at each of the terminal ends of the linear molecule to prevent the escape from the cyclic molecule, and for example, may be selected from a dinitrophenyl, a cyclodextrin, an adamantane, a trityl, a fluorescein, a pyrene, a benzene, a polynuclear aromatic, a steroid, or a combination thereof, each of which may be independently substituted or unsubstituted with a C1 to C20 alkyl group, a hydroxyl group, a halogen group, a cyano group, sulfonyl group, a carboxyl group, an amino group, a phenyl group, or a combination thereof.

A weight average molecular weight of the polyrotaxane may be greater than or equal to about 100,000 g/mol and less than or equal to about 5,000,000 g/mol, for example greater than or equal to about 500,000 g/mol and less than or equal to about 3,000,000 g/mol, or greater than or equal to about 800,000 g/mol and less than or equal to about 2,000,000 g/mol. The weight average molecular weight may be analyzed by a gel permeation chromatography (GPC).

The surface layer 14 may further include, for example, a nanoparticle and the nanoparticle is the same as described above.

For example, the surface layer 14 may include a cured product of the polyrotaxane, a cured product of the fluorine (meth)acrylate, and a cured product of the polyhedral silsesquioxane.

The surface layer 14 may be thinner than each of the protective layer 12 and the self-healing layer 13, and may have a thickness of, for example about 20 nm to about 300 nm. Within the range, the surface layer 14 may have a thickness of, for example about 30 nm to about 250 nm thickness, about 50 nm to about 200 nm, or about 60 nm to about 150 nm.

The laminate 10 may further include at least one additional layer (not shown).

The laminate 10 may have a high water contact angle. Accordingly, the laminate 10 may have sufficient slip properties and good water repellency. The laminate 10 may have for example a contact angle of greater than or equal to about 100 degrees) (°), for example, a contact angle of greater than or equal to about 105°, greater than or equal to 110°, or greater than or equal to 115°. Herein, the contact angle may be measured by using a Sessile drop technique. The contact angle may be measured by using water as a liquid and a drop shape analyzer (DSA100, KRUSS, Germany) and dripping a predetermined amount (about 15 ml) of water on the surface layer 14 of the laminate 10.

The laminate 10 may have for example pencil hardness of greater than or equal to about 6 H, for example, greater than or equal to about 7 H, and for example, greater than or equal to about 8 H within the range. Herein, the pencil hardness may be measured according to ASTM D3363 and may be a maximum pencil hardness at which a scratch is no longer visible after 3 minutes at 50° C. following formation of the scratch with a load of 1 kg.

The laminate 10 may, for example, have a light transmittance of greater than or equal to about 85%, a yellowness index of less than about 1, and haze of less than about 1.

In this way, the laminate 10 includes the protective layer 12, the self-healing layer 13, and the surface layer 14, which are sequentially laminated on the substrate 11, and thus may effectively reduce a damage to the substrate 11, be self-healed from a surface scratch at room temperature within a short period of time, and reinforce slip characteristics.

Accordingly, the mechanical characteristics and surface characteristics of the laminate 10 may be simultaneously satisfied.

The laminate 10 may be a transparent film, for example a transparent flexible film.

The laminate 10 may be usefully applied to a plate or a window film for which transparency and flexibility are beneficial. For example, the laminate 10 may be effectively applied to a window film for an electronic device, for example, a window film for a display device. For example, the laminate 10 may be attached on a surface of the display panel and the display panel and the laminate 10 may be bonded directly or through an intervening adhesive. The display panel may be, for example, a liquid crystal display panel or an organic light emitting display panel, but is not limited thereto. The laminate 10 may be disposed at a side facing a viewer.

Figure 2:
FIG. 2 is a cross-sectional view of a display device according to an embodiment.

FIG. 2 is a cross-sectional view of a display device according to an embodiment.

Referring to FIG. 2, a display device 100 according to an embodiment includes a display panel 50 and a window film 10A.

The display panel 50 may be for example an organic light emitting display (OLED) panel or a liquid crystal display (LCD) panel, and may be, for example, a bendable display panel, a foldable display panel, a rollable display panel, or a combination thereof.

The window film 10A may include the above-described laminate and may be disposed at a side facing a viewer. An additional layer may be disposed between the display panel 50 and the window film 10A. For example a single layer or plurality of polymer layers (not shown) and optionally a transparent adhesion layer (not shown) may be further included.

Figure 3:
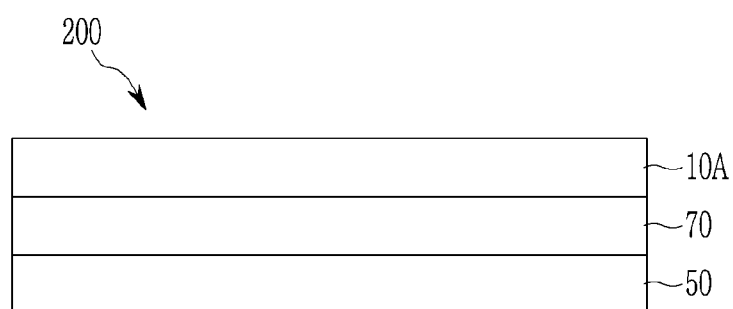
FIG. 3 is a cross-sectional view of a display device according to another embodiment.

FIG. 3 is a cross-sectional view of a display device according to another embodiment.

Referring to FIG. 3, the display device according to an embodiment includes a display panel 50, a window film 10A, and a touch screen panel 70 disposed between the display panel 50 and the window film 10A.

The display panel 50 may be, for example, an organic light emitting display panel or a liquid crystal display panel, for example a bendable display panel, a foldable display panel, a rollable display panel, or a combination thereof.

The window film 10A may include the above-described laminate and may be disposed at a side of a viewer.

The touch screen panel 70 may be disposed adjacent to each of the window film 10A and the display panel 50 to recognize the touched position and the position change when touched by a human hand or a tool through the window film 10A, and then to output a touch signal. The driving module (not shown) may monitor a position where the touch screen panel 70 is touched based on the output touch signal; recognize an icon marked at the touched position; and control the device to carry out the function(s) corresponding to the recognized icon, and display the function performance results on the display panel 50.

An additional layer or layers may be disposed between the touch screen panel 70 and the window film 10A. For example a single polymer layer or plurality of polymer layers (not shown), and optionally a transparent adhesion layer (not shown), may be further included.

Another layer may be disposed between the touch screen panel 70 and the display panel 50. For example a single polymer layer or a plurality of layers polymer layers (not shown), and optionally a transparent adhesion layer (not shown), may be further included.

The laminate 10, or the window film 10A including the same, may be applied to a variety of electronic devices such as a smart phone, a tablet PC, a camera, a touch screen device, and so on, but is not limited thereto.

Hereinafter, the embodiments are illustrated in more detail with reference to examples. However, these examples are exemplary, and the present disclosure is not limited thereto.

PREPARATION OF COMPOSITION

PREPARATION EXAMPLE 1

81 g (0.154 mol) of polycaprolactone diol (PCL 205 U, Daicel Corp.), 5.948 g (0.066 mol) of butanediol, 65.365 g (0.2941 mol) of isophorone diisocyanate, and 73.5 g of ethyl acetate are put in a 3-neck flask in a nitrogen atmosphere and then heated up to 70° C. Upon reaching 70° C., the temperature is constantly maintained, and the mixture is reacted for 3 hours, with stirring. The temperature is decreased down to 60° C., and 19.183 g (0.1474 mol) of hydroxypropyl acrylate is added thereto, and the obtained mixture is additionally reacted for 2 hours with stirring, and a solution obtained therefrom is cooled down to obtain a urethane acrylate oligomer. The obtained urethane acrylate shows a peak at 2270 $cm^{-1}$ (as measured by infrared ray spectroscopic analysis) corresponding to an isocyanate group, and has a weight average molecular weight of about 6,500 g/mol and a glass transition temperature (Tg) of 10° C. The urethane acrylate has a structure including eight urethane groups and an acrylate group at each terminal end, and herein, a mole ratio of diisocyanate to diol to acrylate is 4:3:2. The urethane acrylate has a structure having eight urethane groups and two acrylate groups.

Subsequently, a photoinitiator (Irgacure 184) and trisilanolphenyl POSS (Hybrid Plastics Inc.), each in an amount of 0.5 wt % based on the total weight of a solid in the urethane acrylate solution, are added to the urethane acrylate solution and mixed therewith to prepare a composition.

PREPARATION EXAMPLE 2

81 g (0.154 mol) of polycaprolactonediol (PCL 205 U, Daicel Corp.), 5.948 g (0.066 mol) of butanediol, 73.359 g (0.33 mol) of isophorone diisocyanate, and 80 g of ethyl acetate are put and mixed in a 3-neck flask in a nitrogen atmosphere and then, heated up to 70° C. Subsequently, upon reaching 70° C., the temperature is constantly maintained, and the obtained mixture is reacted for 3 hours, with stirring. The temperature is decreased down to 60° C., then, 28.631 g (0.22 mol) of hydroxypropyl acrylate is added thereto, the obtained mixture is additionally reacted for 2 hours, and a solution obtained therefrom is cooled down to obtain a urethane acrylate oligomer. The obtained urethane acrylate shows a peak at 2270 $cm^{-1}$ corresponding to an isocyanate group in an infrared ray spectroscopic analysis, and has a weight average molecular weight of about 4600 g/mol and a glass transition temperature (Tg) of 17° C. The urethane acrylate has a structure including six urethane groups positioned between an acrylate group at each of the terminal ends, and herein, a mole ratio of diisocyanate to diol to acrylate is 3:2:2. The urethane acrylate has a structure having six urethane groups and two acrylate groups.

A photoinitiator (Irgacure 184) and trisilanolphenyl POSS (Hybrid Plastics Inc.), each in an amount of 0.5 wt % based on the total weight of a solid in the urethane acrylate solution, are added to the urethane acrylate solution and mixed therewith to prepare a composition.

PREPARATION EXAMPLE 3

35 wt % of polyrotaxane (SM-3403P, Advanced Softmaterials Inc.) including a cyclodextrin cyclic molecule substituted with a polycaprolactone functional group having a methacrylate group at the terminal end, a polyethylene glycol-based linear molecule penetrating a ring of the cyclodextrin cyclic molecule, and an adamantane capping group at both of the terminal ends of the linear molecule, and in addition, having a molecular weight of about 1,000,000 g/mol, is combined with 33 wt % of acryl polyhedral silsesquioxane (Hybrid Plastics Inc.), 1 wt % of fluorinated propyl polyhedral silsesquioxane (Hybrid Plastics Inc.), 16 wt % of trisilanolphenyl polyhedral silsesquioxane (Hybrid Plastics Inc.), 9 wt % of a fluorinated acryl compound (KY-1203, Shin-Etsu Chemical Co., Ltd.), 4 wt % of a silicon-based acryl compound (FM-7725, JNC Co.), and 2 wt % of a photoinitiator (Irgacure 184, Ciba) to prepare a composition.

MANUFACTURE OF LAMINATE

EXAMPLE 1

The composition according to Preparation Example 2 is coated on a 100 μm-thick polyethylene terephthalate (PET) film (elastic modulus: 2.3 GPa), dried at 80° C. for 10 minutes, and ultraviolet (UV) light-cured for 3 seconds to form a 60 μm-thick substrate protective layer.

Subsequently, the composition according to Preparation Example 1 is coated on the protective layer, dried at 80° C. for 10 minutes, and ultraviolet (UV) light-cured for 2 minutes to form a 60 μm-thick self-healing layer.

On the self-healing layer, the composition according to Preparation Example 3 is coated, dried at 120° C. for 1 minute, and ultraviolet (UV) light-cured to form a 60 nm-thick surface layer to manufacture a laminate.

EXAMPLE 2

A laminate is manufactured according to the same method as Example 1, except for forming the surface layer to be 300 nm thick.

EXAMPLE 3

A laminate is manufactured according to the same method as Example 1, except for forming the self-healing layer to be 100 μm thick.

COMPARATIVE EXAMPLE 1

A laminate is manufactured according to the same method as Example 1, except for not forming the substrate protective layer and the surface layer.

COMPARATIVE EXAMPLE 2

A laminate is manufactured according to the same method as Example 1, except for not forming the substrate protective layer.

COMPARATIVE EXAMPLE 3

A laminate is manufactured according to the same method as Example 1, except for not forming the surface layer.

COMPARATIVE EXAMPLE 4

A laminate is manufactured according to the same method as Example 1, except for forming the substrate protective layer by using the composition according to Preparation Example 1 instead of the composition according to Preparation Example 2 and forming the self-healing layer by using the composition according to Preparation Example 2 instead of the composition according to Preparation Example 1.

COMPARATIVE EXAMPLE 5

A laminate is manufactured according to the same method as Example 1, except for forming the substrate protective layer by using the composition according to Preparation Example 1 instead of the composition according to Preparation Example 2.

COMPARATIVE EXAMPLE 6

A laminate is manufactured according to the same method as Example 1, except for forming the self-healing layer to be 10 μm thick.

COMPARATIVE EXAMPLE 7

A laminate is manufactured according to the same method as Example 1, except for forming the self-healing layer to be 30 μm thick.

COMPARATIVE EXAMPLE 8

A laminate is manufactured according to the same method as Example 1, except for forming the surface layer to be 10 nm thick.

COMPARATIVE EXAMPLE 9

A laminate is manufactured according to the same method as Example 1, except for forming the surface layer to be 500 nm thick.

Evaluation

Evaluation I

An elastic modulus of each layer in the laminates according to the Examples and the Comparative Examples is measured.

The elastic modulus is measured by preparing each specimen having a size of 10 mm×10 mm×5 mm and using dynamic mechanical analysis (DMA) (SDTA861, Mettler-Toledo (S) Pte Ltd.).

The results are shown in Table 1.

TABLE 1

|  | Substrate protective layer (MPa) | Self-healing layer (MPa) |
|---|---|---|
| Examples 1, 2, and 3 Comparative Examples 3 and 6 to 9 | 7.5 | 2.5 |
| Comparative Example 1 | — | 2.5 |
| Comparative Example 2 | — | 2.5 |

TABLE 1-continued

|  | Substrate protective layer (MPa) | Self-healing layer (MPa) |
|---|---|---|
| Comparative Example 4 | 2.5 | 7.5 |
| Comparative Example 5 | 2.5 | 2.5 |

Evaluation II

A friction coefficient of the laminates according to the Examples and the Comparative Examples is measured.

The friction coefficient is measured by using a friction-measuring instrument (FPT-F1, Labthink Instruments Co., Ltd.).

The results are shown in Table 2.

TABLE 2

|  | Friction Coefficient |
|---|---|
| Example 1, 2, and 3 | 0.15 |
| Comparative Examples 1 and 3 | 1.3 |

Evaluation III

The friction coefficient, a contact angle, and self-healing pencil hardness of the laminates according to the Examples and the Comparative Examples are evaluated.

The contact angle is measured by a Sessile drop technique, performed by dropping water on each laminate with a Drop shape analyzer (DSA100, KRUSS, Germany) and using a Sessile drop technique.

The self-healing pencil hardness is evaluated by fixing each laminate on a 2 mm-thick glass plate, scratching the laminate with a pencil under a vertical load of 1 kg at 60 millimeters per minute (mm/min), and finding a maximum pencil hardness at which the scratch is no longer visible after 3 minutes at 50° C., as visually observed with the naked eye. Herein, the self-healing pencil hardness is measured by using an automatic pencil scratch hardness tester (No. 553-M1, YASUDA SEIKI SEISAKUSHO LTD.) and a Mitsubishi pencil according to ASTM D3363 standard.

The results are shown in Table 3.

TABLE 3

|  | Contact angle (degree) | Self-healing pencil hardness | Self-healed or not after scratch with 8H pencil |
|---|---|---|---|
| Example 1 | 115 | 8H | ⊚ |
| Example 2 | 115 | 8H | ⊚ |
| Example 3 | 115 | 6H | ○ |
| Comparative Example 1 | 91 | <2H | X |
| Comparative Example 2 | 115 | <2H | X |
| Comparative Example 3 | 91 | 4H | X |
| Comparative Example 4 | 115 | <2H | X |
| Comparative Example 5 | 115 | <2H | X |
| Comparative Example 6 | 115 | <1H | X |
| Comparative Example 7 | 115 | 2H | X |
| Comparative Example 8 | 113 | <2H | X |
| Comparative Example 9 | 115 | <2H | X |

⊚: no scratch,
○: almost no scratch (a few minute scratches),
X: a distinct scratch Referring to Table 3, the laminates according to the Examples show a high contact angle and have a high self-healing pencil hardness compared with the laminates according to the Comparative Examples. In particular, Examples 1 to 3 and Comparative Examples 4 and 5 show different self-healing properties and the presence of damage (or not) on a substrate depends on an elastic modulus of a self-healing layer and a protective layer. Accordingly, the laminates according to Examples 1 to 3 show improved surface characteristics such as slip properties, self-healing properties, and mechanical characteristics compared with the laminates according to Comparative Examples 1 to 9.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a display panel, and
   a window film, the window film including
      a substrate,
      a protective layer on the substrate,
      a self-healing layer on the protective layer, a thickness of the self-healing layer being greater than or equal to about 50 micrometers, and
      a surface layer on the self-healing layer,
   wherein an elastic modulus of the protective layer is greater than an elastic modulus of the self-healing layer, and
   a friction coefficient of the surface layer is less than or equal to about 1.

2. The display device of claim 1, wherein the elastic modulus of the protective layer is about 1.2 times to about 50 times greater than the elastic modulus of the self-healing layer.

3. The display device of claim 1, wherein the elastic modulus of the self-healing layer is about 0.1 megapascals to about 100 millipascals.

4. The display device of claim 1, wherein the elastic modulus of the protective layer is less than an elastic modulus of the substrate.

5. The display device of claim 1, wherein the surface layer is thinner than the protective layer and the self-healing layer.

6. The display device of claim 1, wherein a thickness of the surface layer is about 20 nanometers to about 300 nanometers.

7. The display device of claim 1, wherein a thickness of the protective layer is about 20 micrometers to about 100 micrometers, and
   a thickness of the self-healing layer is about 50 micrometers to about 100 micrometers.

8. The display device of claim 1, wherein the protective layer and the self-healing layer each comprise a polymer having a cross-linked structure, and
   a cross-link density of the protective layer is greater than cross-link density of the self-healing layer.

9. The display device of claim 1, wherein the protective layer and the self-healing layer each independently comprise a cured product of a multi-functional urethane, a cured product of a multi-functional epoxy, a cured product of a multi-functional urea, or a combination thereof.

10. The display device of claim 1, wherein the self-healing layer comprises a cured product of a first urethane (meth)acrylate comprising a (meth)acrylate group and at least six urethane groups.

11. The display device of claim 10, wherein the self-healing layer further comprises silica, a metal oxide, a substituted or unsubstituted polyhedral silsesquioxane, or a combination thereof.

12. The display device of claim 10, wherein the protective layer comprises a cured product of a second urethane (meth)acrylate comprising at least two (meth)acrylate groups and at least one urethane group, wherein the number of the urethane groups in the second urethane (meth)acrylate is less than the number of the urethane groups in the first urethane (meth)acrylate.

13. The display device of claim 12, wherein the protective layer further comprises silica, a metal oxide, a substituted or unsubstituted polyhedral silsesquioxane, or a combination thereof.

14. The display device of claim 1, wherein the surface layer comprises a cured product of silicon (meth)acrylate, a cured product of a fluorine (meth)acrylate, a cured product of a urethane (meth)acrylate, a cured product of a polyrotaxane, or a combination thereof.

15. The display device of claim 14, wherein the surface layer further comprises silica, a metal oxide, a substituted or unsubstituted polyhedral silsesquioxane, or a combination thereof.

16. The display device of claim 1, wherein the surface layer comprises a cured product of polyrotaxane, a cured product of a fluorine (meth)acrylate, and a cured product of a polyhedral silsesquioxane.

17. The display device of claim 1, wherein the substrate comprises polyethylene terephthalate, polycarbonate, polyimide, polyamide, polyamideimide, or a combination thereof.

18. The display device of claim 1, wherein the display panel is an organic light emitting display panel or a liquid crystal display panel.

19. The display device of claim 1, further comprising a touch screen panel between the display panel and the window film.

20. An electronic device comprising the display device of claim 1.

* * * * *